United States Patent [19]

Orr

[11] Patent Number: 5,390,945
[45] Date of Patent: Feb. 21, 1995

[54] LOW-SPEED MANEUVERABILITY ENHANCEMENT FOR LONG SINGLE-UNIT VEHICLES

[75] Inventor: Larry W. Orr, Bellevue, Wash.

[73] Assignee: Paccar Inc., Bellevue, Wash.

[21] Appl. No.: 157,945

[22] Filed: Nov. 23, 1993

[51] Int. Cl.⁶ ............................................. B62D 9/00
[52] U.S. Cl. ................................... 280/98; 280/704; 180/24.01
[58] Field of Search .................. 180/24.01; 280/704, 280/98

[56] References Cited

U.S. PATENT DOCUMENTS

| | | | |
|---|---|---|---|
| 876,406 | 1/1908 | Simonson . | |
| 1,674,805 | 6/1928 | Stebbins . | |
| 1,927,088 | 9/1933 | Gertlinger | 280/104 |
| 2,599,043 | 6/1952 | Bissell | 180/22 |
| 2,698,668 | 1/1955 | McKay | 180/22 |
| 2,791,286 | 5/1957 | Baster | 180/22 |
| 3,108,821 | 10/1963 | Krauss | 280/103 |
| 3,481,418 | 12/1969 | Wallan | 180/24.01 |
| 3,596,730 | 8/1971 | Cecce | 180/79.2 R |
| 3,903,979 | 9/1975 | Perrotin | 180/23 |
| 4,134,601 | 1/1979 | Propst | 280/408 |
| 4,295,657 | 10/1981 | Sano et al. | 280/91 |
| 4,373,738 | 2/1983 | Lange | 280/81.5 |
| 4,383,696 | 5/1983 | Picard | 280/81 R |
| 4,462,477 | 7/1984 | Mastro | 180/24.02 |
| 4,856,814 | 8/1989 | Jones | 280/704 |
| 4,941,671 | 7/1990 | Ellingsen | 280/91 |
| 5,035,439 | 7/1991 | Petrillo | 280/81.6 |
| 5,076,450 | 12/1991 | Shimizu | 280/98 |

*Primary Examiner*—Kenneth R. Rice
*Attorney, Agent, or Firm*—Seed and Berry

[57] ABSTRACT

An elongated single-unit vehicle having a steering system that provides increased vehicle maneuverability at slow speeds. The vehicle has a front steering axle connected to steerable front wheel assemblies, an auxiliary steering axle connected to steerable wheel assemblies and positioned rearward of the front steering axle, and a rear axle and wheel assemblies rearward of the auxiliary steering axle and positioned at the rear portion of the vehicle. A remotely adjustable linkage assembly is coupled to the front and auxiliary steering axles and connected to the steerable front end auxiliary wheel assemblies, so the ratio of the degree of wheel turn of the front wheels to the degree of wheel turn of the auxiliary wheels can be adjusted from a remote position, such as the driving compartment of the vehicle. An axle lifting mechanism is connected to the front steering axle and adapted to move the steerable front wheel assemblies between a lowered position, wherein the wheel assemblies engage the ground, and a lifted position, wherein the front wheel assemblies are off the ground.

23 Claims, 3 Drawing Sheets

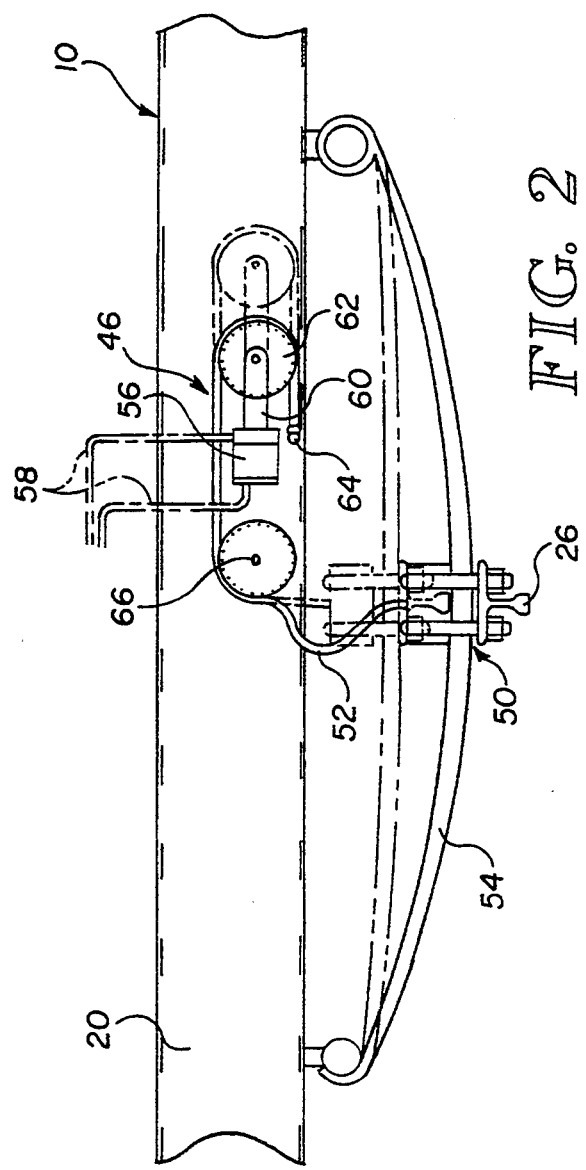

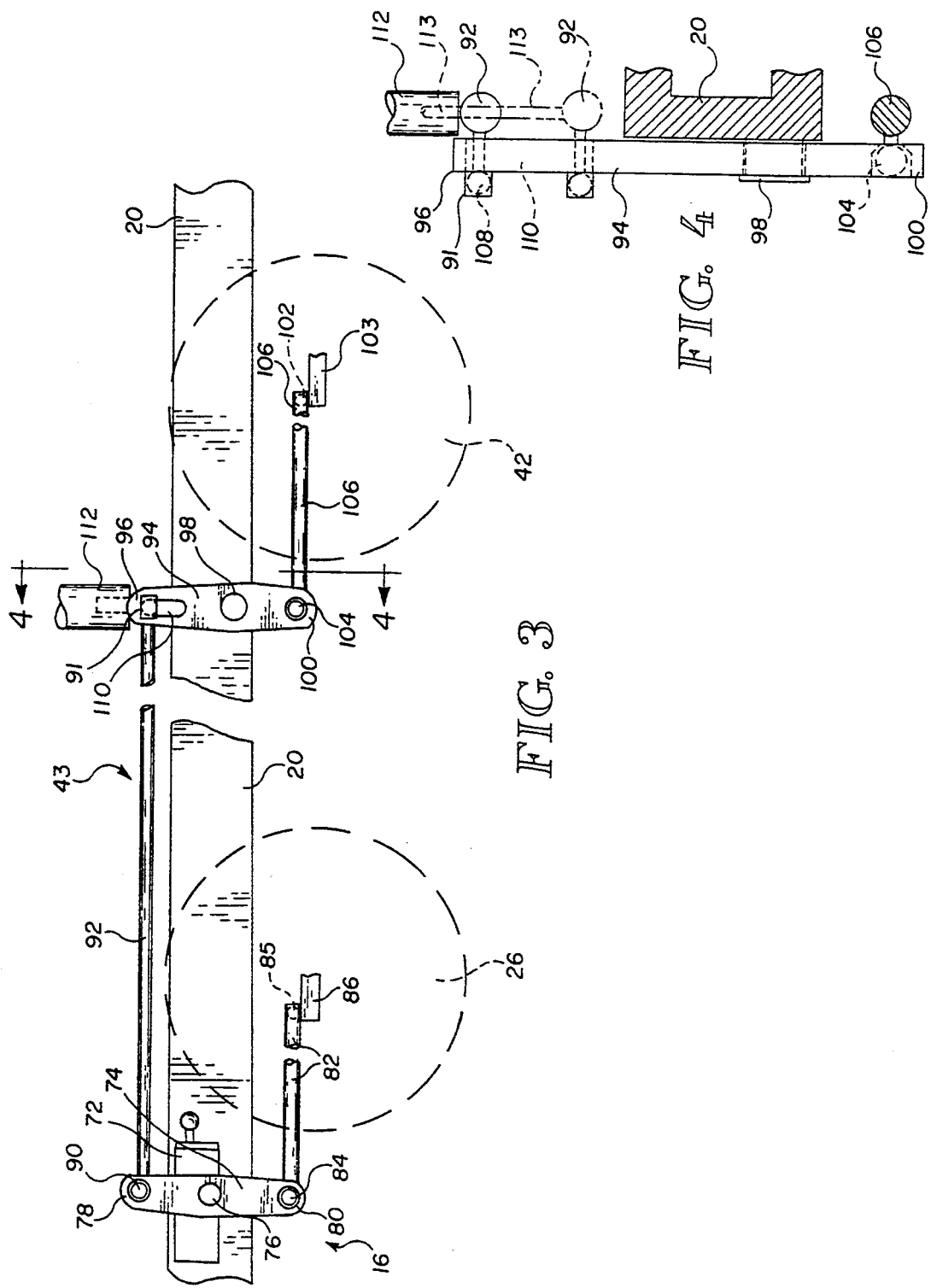

LOW-SPEED MANEUVERABILITY ENHANCEMENT FOR LONG SINGLE-UNIT VEHICLES

TECHNICAL FIELD

The subject invention relates to a motor vehicle having a steering system, and more particularly to a long single-unit vehicle having a steering system that provides enhanced maneuverability at low speed.

BACKGROUND OF THE INVENTION

Certain types of single-unit vehicles such as buses, transporters of special equipment, large motor homes, and other transportation vehicles are built to the maximum legal length of approximately 40 feet to maximize their hauling capabilities while maintaining the benefits of a single-unit vehicle. A long single-unit vehicle typically has a steering axle and steerable wheel assemblies at their front end and one or more axles and wheel assemblies at their rear end. As such, the vehicle has a relatively long wheel base, which is the distance between the forward most wheel assembly that engages the ground and the rearward most wheel assembly that engages the ground. To accommodate the long wheel base, the long single-unit vehicle typically has a long turning radius and is difficult to maneuver around corners and the like. In addition, the rear wheel assemblies of the long vehicle do not follow the path of the front steerable wheel assemblies when the vehicle negotiates a corner so the rear wheel assemblies substantially cut the corner. As such, the long single-unit vehicle requires a substantial amount of maneuvering room which is not always available in, for example, a loading dock area or a parking lot.

Long vehicles, including tractor-trailer vehicles, have used steering systems that improve maneuverability of the vehicle, wherein the steering system includes a rear steering axle with steerable rear wheels. The rear steering axle and wheels are controlled independently from the vehicle's front steering axle. The rear steering axle must be raised until the wheels lift off the ground, pivoted to a desired steering angle, and then lowered until the wheels engage the ground before the vehicle begins a turn. Accordingly, the rear steering axle system is difficult and slow to operate.

Long single-unit vehicles have also used steering systems that include an auxiliary steering axle rearward of a front steering axle, wherein front and auxiliary steerable wheels act in concert to steer the front portion of the vehicle through a turn. This front and auxiliary steering axle arrangement provides additional stability for the front portion of the vehicle and improved tracking of the rear wheels during some turning maneuvers. However, the dual steering axle system does not change the length of the vehicle's wheel base so low speed maneuvering of the vehicle around short radius corners or the like remains difficult and very cumbersome.

Long single-unit vehicles have also used steering systems wherein an auxiliary steering axle is provided rearward of the front steering axle and the auxiliary steering axle may be raised or lowered such that the auxiliary wheels may be lifted off the ground or lowered into engagement with the ground. However, the vehicle's wheel base remains constant regardless of whether the auxiliary wheels are on the ground so the vehicle's maneuverability through slow, tight turns, is not improved. In addition, the range of angles through which the auxiliary wheels turn remains constant so the vehicle's steering ratio, which is the range of angles through which the auxiliary wheels turn compared to the range of angles through which the front wheels turn, remains constant regardless of whether the auxiliary steering axle is raised or lowered. As a result, this steering system does not enhance maneuverability of the long single-unit vehicle during slow speed maneuvers.

Accordingly, it is an object of the subject invention to provide an elongated single-unit vehicle having a steering system that provides enhanced maneuverability at slow speeds.

It is another object of the subject invention to provide an elongated single-unit vehicle having a steering system wherein the steering ratio between front steerable wheel assemblies and auxiliary wheel assemblies may be remotely adjusted by changing the range of turn angles through which the auxiliary steerable wheel assemblies will turn during slow speed maneuvers.

It is another object of the subject invention to provide an elongated single-unit vehicle having a steering mechanism wherein front steerable wheel assemblies on the front steering axle can be lifted off the ground as to shorten the wheel base of the vehicle.

It is yet a further object of the present invention to provide an elongated single-unit vehicle having a steering system wherein the front steerable wheel assemblies may be lifted off the ground, and the steering ratio between the front and the auxiliary steerable wheel assemblies may be remotely adjusted to provide for increased turning angles of the auxiliary wheel assemblies during slow speed maneuvers, thereby increasing the maneuverability of the vehicle.

SUMMARY OF THE INVENTION

In accordance with these and many other objects, the subject invention provides an elongated single-unit vehicle having a steering system adapted to remotely adjust the steering ratio so as to provide enhanced maneuverability of the vehicle at slow speeds.

In a preferred embodiment of the invention, the vehicle has a front steering axle with steerable front wheel assemblies connected thereto, at least one rear axle with rear wheel assemblies connected thereto, and an auxiliary steering axle with steerable auxiliary wheel assemblies connected thereto, wherein the auxiliary steering axle is located at the forward portion of the vehicle between the front and rear axles. A remotely adjustable assembly is coupled to a vehicle steering mechanism and is coupled to the front and auxiliary steering axles so as to simultaneously turn the front and auxiliary wheel assemblies, wherein the auxiliary wheel assemblies turn through a range of turn angles proportional to the range of turn angles for the front wheel assemblies. The remotely adjustable assembly is connected to an adjustment mechanism that can be activated from a remote position to change the range of turn angles for the auxiliary wheels, thereby changing the vehicle's steering ratio. An axle lifting mechanism is connected to the front steering axle and is adapted to move the front steering axle between a lowered position wherein the front wheels engage the ground and a lifted position wherein the front wheels are lifted off the ground.

In one embodiment of the present invention the remotely adjustable assembly is a linkage assembly that enables an operator to change the steering ratio from inside a driver compartment area of the vehicle. The linkage assembly has a forward transmission arm coupled to the steering mechanism and coupled to a front wheel assembly. A rearward transmission arm is coupled to the forward transmission arm and to an auxiliary wheel assembly so the forward and rearward transmission arms move simultaneously causing the front and auxiliary wheels to turn simultaneously when the vehicle's steering mechanism is adjusted. The rearward transmission arm is coupled to a hydraulic actuator that changes the range of angles through which the auxiliary wheels turn, thereby changing the steering ratio of the vehicle.

BRIEF DESCRIPTION OF THE DRAWINGS

FIG. 2 is an enlarged schematic side elevation view of an axle lifting mechanism attached to the front steering axle of the vehicle of FIG. 1.

FIG. 3 is an enlarged schematic side elevation view of a linkage assembly coupled to front and auxiliary steering axles of the vehicle of FIG. 1.

FIG. 4 is an enlarged partial cross-section view taken along line 4—4 in FIG. 3.

DETAILED DESCRIPTION OF THE INVENTION

Figure 1:
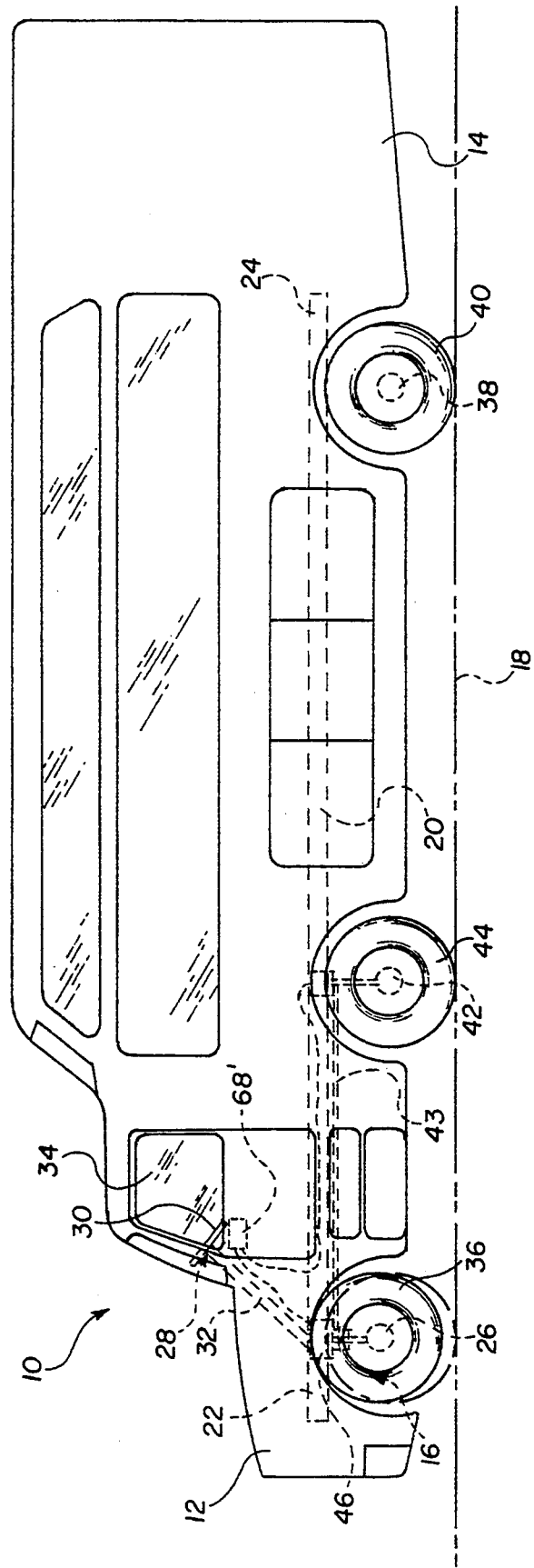
FIG. 1 is a schematic representation of an elongated single-unit vehicle having a steering system of the present invention with a front steering axle in a raised position.

As seen in FIG. 1, an elongated single-unit vehicle 10 in accordance with the present invention has a front end 12, a rear end 14 opposite the front end, and a steering system 16 that provides increased vehicle maneuverability during slow speed maneuvers, such as turning the vehicle through a sharp turn while the vehicle slowly moves frontward or backward over the ground 18. The vehicle 10 further has a frame 20 with a front portion 22 at the front end of the vehicle and rear portion 24 near the rear end of the vehicle. A front steering axle 26 is attached to the front portion of the frame and is connected to steerable front wheel assemblies 36 that are adapted to engage the ground on left and right sides of the vehicle. The front wheels are controlled by a vehicle steering mechanism 28 that includes, for example, a conventional steering wheel 30 located in a cab 34 or other driver compartment area of the vehicle. The steering mechanism is coupled to the front wheels in a manner such that the front wheels 36 will pivot through a desired range of angles relative to the frame 20 when an operator turns the steering wheel.

The vehicle further has, at the rear portion of the frame, a conventional rear axle 38 with rear wheel assemblies 40 that engage the ground 18 on the left and right sides of the vehicle. An auxiliary steering axle 42 is connected to the front portion 22 of the frame between the front steering axle 26 and the rear axle. The auxiliary steering axle is connected to steerable auxiliary wheel assemblies 44 that also engage the ground on the left and right sides of the vehicle. In the preferred embodiment, the auxiliary steering axle and auxiliary wheels are located such that the distance between the front and auxiliary steering axles is approximately 30% to 40% of the distance between the front and rear axles.

The front steering axle 26 is connected to an axle lifting mechanism 46 that is adapted to move the front steering axle between a lowered position, wherein the front wheels 36 engage the ground 18 (shown in phantom in FIG. 1), and a lifted position, wherein the front wheels are off the ground. When the front steering axle is in the lowered position, the vehicle 10 has a long wheel base suitable for driving at higher speeds, whereby the vehicle is steered by simultaneously turning or controlling the front and auxiliary wheels so the middle portion of the vehicle tracks behind the front end of the vehicle. However, when the front steering axle is in the lifted position and the front wheels are off the ground, the vehicle has a shortened wheel base which is only suitable for driving at slow speeds because of the vehicle's weight distribution. Therefore, the wheel base of the preferred embodiment can be instantly shortened by 30% to 40% upon moving the front steering axle to the lifted position, whereby the vehicle is steered by turning or controlling the auxiliary wheels.

The steerable front and auxiliary wheels 36 and 44 are coupled to the vehicle steering mechanism 28 such that when the vehicle operator turns the steering wheel 30, the front and auxiliary wheels pivot in the same direction simultaneously, although not through the same number of degrees of wheel turn angle. The front wheels are adapted to turn through a first range of turn angles and the auxiliary wheels are adapted to turn through a second range of turn angles. The ratio between the first range of turn angles and the second range of turn angles is known as the vehicle's steering ratio.

The steering system 16 further has a linkage assembly 43 coupled to the front and auxiliary steering axles 26 and 42 and their associated wheels 36 and 44, wherein the linkage assembly is adapted to be remotely adjusted by the operator from within the cab 34 so as to change the steering ratio by increasing or decreasing the range of angles through which the auxiliary wheels will turn. Accordingly, the operator can remotely adjust the steering ratio when the front steering axle is in the lifted position so the auxiliary wheels will turn through a greater range of angles for a given range of adjustment of the steering wheel. This greater turn angle of the auxiliary wheels allows the vehicle to turn through smaller radius turns that are often encountered during slow turning maneuvers. This ability to negotiate tighter corners makes parking the vehicle, for example, at a loading dock, substantially easier.

As best seen in FIG. 2, the axle lifting mechanism 46 on the vehicle 10 is connected to the frame 20 above the front steering axle 26 and above a conventional front suspension system 50. A cable 52 or the like is anchored at one end 64 to the frame and at the opposite end to the front steering axle. The mid-portion of the cable is connected to a hydraulic actuator 56 mounted on the frame and connected to conventional hydraulic lines 58 of the vehicle's hydraulic system. The actuator, which is controlled by a control mechanism 68 or the like in the cab 34 of the vehicle 10 shown in FIG. 1, acts on the cable causing the cable to lift the front steering to the lifted position.

In the preferred embodiment, the hydraulic actuator 56 is a conventional hydraulic cylinder having a moveable cylinder rod 60 that can be extended or retracted upon activation of the hydraulic system. A rotatably mounted round sheave 62 is connected to the cylinder rod and adapted to receive the cable 52 around a portion of its perimeter. A second sheave 66 is connected to the frame adjacent to the actuator and above the forward steering axle 26. The second sheave is also adapted to receive the cable around a portion of its perimeter, such that the cable is routed from its anchored end on the frame, around a portion of the round sheave, to the top of the second sheave, around a portion of the second sheave's perimeter, and down to the forward steering axle.

Accordingly, when the hydraulic actuator 56 is activated and the cylinder rod 60 moves to an extended position, as shown in phantom in FIG. 2, the round sheave 62 is moved away from the second sheave 66, thereby extending the span between the sheaves. As such, the cable 52 is drawn over the sheaves, which in turn, causes the cable to exert an upward force on the steering axle 26. This upward force raises the front steering axle 26 to the lifted position, as shown in phantom, and simultaneously compressing the front suspension springs 54 of the vehicle. In this position, the suspension springs push downward and act as a biasing mechanism to bias the lifting mechanism toward the lowered position. Conversely, retraction of the cylinder rod 60 slackens the cable 52 and allows the front steering axle to be forced downward to the lowered position by the suspension springs 54 so the front wheels engage the ground.

An axle lifting mechanism 46 is provided on the left and right sides of the frame and is connected to the left and right sides of front steering axle 26, so both sides of the axle are raised simultaneously without putting undesirable twisting forces on the axle. Although the preferred embodiment uses a hydraulic axle lifting system, other systems such as a compressed air system or an electric system utilizing a small electric winch could be used in place of the hydraulic system.

As best seen in FIG. 1 and 3 the steering system 16 has a linkage assembly 43 connected to the frame 20 of the vehicle 10 near the front and auxiliary steering axles, 26 and 42. The linkage assembly 43 has a forward pitman arm 74 or other transmission arm mechanism, that is pivotally mounted to the frame 20. The forward pitman arm is connected in a conventional manner to a steering gear 72 mounted on the frame and coupled to the steering wheel 30 by a conventional steering shaft 32 shown in FIG. 1. Accordingly, rotation of the steering wheel turns the steering shaft, which turns the steering gear and causes the forward pitman arm to pivot about a pivot point 76 mounted on the frame.

The pitman arm 74 has a top portion 78 above the pivot point 76 and a bottom portion 80 below the pivot point. The top and bottom portions extend in opposite directions and terminate beyond the edges of the frame. Such a pitman arm is sometimes referred to as a double pitman arm. The bottom portion 80 is pivotally connected to one end of a drag link 82 by a conventional ball joint 84 that allows rotation of the pitman arm to be translated into lateral movement of the drag link. The drag link is pivotally connected at its opposite end to a conventional front-wheel steering control arm 86 of the front wheel assembly 36 by a ball joint 85, so the lateral movement of the drag link causes at least one of the front wheel assemblies 36 to pivot through a range of turn angles. In the preferred embodiment, the left and right front wheel assemblies are interconnected by a tie rod that attaches to the steering control arm of each wheel assembly. Thus, both front wheel assemblies will simultaneously turn through the same degree of turn angles.

The top portion 78 of the pitman arm 74 is pivotally connected with a ball joint 90 to a forward end of a relay link 92. The relay link extends rearward parallel to the drag link 82. Thus, when the steering gear 72 pivots the forward pitman arm about the pivot point 76, the drag link and the relay link are moved laterally in opposite directions. The extent of lateral movement of the drag and relay links for a given rotation of the forward pitman arm is determined by the length of the pitman arm between the pivot point 76 and the ball joints 84 and 90, respectively. A larger distance results in greater lateral movement of the links, and a shorter distance results in less lateral movement of the links. Accordingly, the lengths of the top and bottom portions 78 and 80 of the forward pitman arm are adapted to achieve the desired lateral movement of the drag and relay links.

The relay link 92 connects at its rearward end to a relay pitman arm 94 that is pivotally coupled to the frame 20 just forward of the auxiliary steering axle 42. In the preferred embodiment, the relay pitman arm 94 is mounted on a pivot 98 connected to the frame at a position below the longitudinal axis of the frame. Similar to the forward pitman arm, the relay pitman arm has a top portion 96 and a bottom portion 100 above and below the pivot point, respectively. The top portion of the relay pitman arm is connect to the rearward end of the relay link with a sliding ball joint 91. As such, the pivotal movement of the forward pitman arm 74 is directly transmitted to the relay pitman arm by the relay link.

The top portion 96 of the relay pitman arm 94 has a slot 110 therein that receives the sliding ball joint 91, such that the distance between the pivot 98 and the connecting point of the relay pitman arm 94 and the relay link can be varied by moving the sliding ball joint vertically within a slot. Similar to the forward pitman arm, the relay pitman arm will pivot through a greater angle when the distance between the pivot point 98 and the sliding ball joint 91 is smaller. Conversely, the relay pitman arm will pivot through less of an angle when the distance is greater. Thus, changing of the distance along the relay pitman arm between the pivot point and the sliding ball joint effectively changes the amount the relay pitman arm will pivot in response to a given lateral movement of the relay link 92, as discussed in greater detail below.

At the opposite end of the relay pitman arm 94, the bottom portion 100 is pivotally connected to the forward end of an auxiliary drag link 106 by a conventional ball joint 104. The auxiliary drag link extends rearward parallel to the relay link 92 and pivotally connects by a ball joint 102 to a conventional auxiliary wheel steering arm 103 on the auxiliary wheel assembly 44. Accordingly, the auxiliary drag link and the relay link move laterally in opposite directions upon rotation of the relay pitman arm, and the lateral movement of the auxiliary drag link causes at least one of the auxiliary wheel assemblies to pivot through a range of turn angles. In the preferred embodiment, the left and right auxiliary wheel assemblies are also interconnected by a tie rod that connects to the steering control arm of each auxiliary wheel. Thus, both auxiliary wheel assemblies will simultaneously turn through the same degree of turn angles.

As indicated above, the range through which the auxiliary wheels will turn is controlled by the range through which the relay pitman arm 94 will pivot. Because the distance between the pivot point 98 and the ball joint 104 on the relay pitman arm is fixed, the range of angles through which the relay pitman arm will pivot is changed by moving the sliding ball joint 91 along the length of the slot 110.

Referring to FIGS. 1 and 4, the sliding ball joint 91 has a sliding ball structure 108 slidably disposed within the slot 110 and connected to the relay link 92. A hydraulic actuator 112 is connected to the relay link 92 at its rearward end adjacent to the sliding ball and is adapted to move the sliding ball along the length of the slot, thereby effectively changing the range of angles through which the auxiliary wheels 44, shown in FIG. 1, will turn.

The hydraulic actuator 112 is controlled by the hydraulic system of the vehicle and is activated by a conventional switch or the like located in the cab 34 of the vehicle. The hydraulic actuator has a rod 113 that can be moved between an extended position, as shown in phantom in FIG. 3, and a retracted position. When the rod is retracted, the sliding ball is moved to the top of the slot, such that the distance between the sliding ball and the pivot point 98 is maximized. Thus, the auxiliary wheels will turn through a smaller range of turn angles. When the rod is in the extended position, the sliding ball is at the bottom of the slot, such that the distance between the sliding ball and the pivot point is minimized. Thus, the amount the relay pitman arm will pivot is maximized so the auxiliary wheels will turn through a larger range of turn angles. Although the preferred embodiment uses the hydraulic actuator 112, other actuators can be used to move the sliding ball within the slot.

Accordingly, the position of the sliding ball 108 within the slot 110 can be remotely changed or adjusted by an operator in the vehicle's cab activating the hydraulic actuator 112, and thereby remotely adjusting the steering ratio of the vehicle between a first and second steering ratio by changing the range of turn angles through which the auxiliary wheels 44 will turn. In the preferred embodiment, the sliding ball 108 is positioned at the top of the slot, thereby providing the first steering ratio that is used when the front wheels 36 are in the lowered position. The second steering ratio is achieved with the sliding ball in the bottom of the slot so the auxiliary wheels turn sharper. This second steering ratio is used when the front wheels are lifted off the ground to provide enhanced maneuverability of the vehicle 10 for slow speed maneuvers.

Therefore, the steering system 16 enables an operator of the vehicle to remotely change the steering ratio of the vehicle when enhanced maneuverability is desired, and to simultaneously and remotely activate the axle lifting mechanism 46 to lift the front wheels off the ground.

In the preferred embodiment, the vehicle 10 is operated at elevated speeds, e.g. speed achieved in gears other than the lowest forward and reverse gears, with the front steering axle 26 in the lowered position to provide a longer wheel base. When the operator wants to slowly steer the vehicle around a path having a curve, such as a tight radius corner, the operator stops the vehicle, remotely adjusts the steering ratio to change the range of angles through which the auxiliary wheels 44 will turn, and activates the axle lifting mechanism 46 to lift the front wheels 36 off the ground. The vehicle is then moved slowly forward or backward around the curve while the driver controls the turn angle of the auxiliary wheels with the steering wheel. Thereafter, the front steering axle can be lowered to the lowered position and the steering ratio can be adjusted back to the first steering ratio used with the front steering axle in the lowered position.

In the preferred embodiment, the steering system 16 and the axle lifting mechanism 46 are controlled by a control mechanism 68, shown in FIG. 1. The control mechanism includes a plurality of interlocks that prevent the steering ratio from being changed while the front steering axle 26 is in the lowered position. Other interlocks are provided so the vehicle may move forward or backward only in the lowest forward gear and the lowest rearward gear after the steering ratio has been changed so the auxiliary wheels turn sharper, thereby assuring that the maneuverability enhancement system can only be utilized at slow speeds. This safety precaution avoids the danger of overturning the elongated single-unit vehicle as a result of the forces generated when turning the vehicle on a substantially shorter wheel base at too high of a speed.

Numerous modifications and variations of the low speed maneuverability enhancement for long single unit vehicles disclosed herein will occur to those skilled in the art in view of this disclosure. Therefore, it is to be understood that these modifications and variations, and equivalents thereof, may be practiced while remaining within the spirit and the scope of the invention as defined by the following claims.

We claim:

1. An elongated single-unit vehicle having a steering system that provides increased vehicle maneuverability, comprising:
    a vehicle frame having front and rear portions;
    a front steering axle connected to said front portion of said frame and connected to steerable front wheel assemblies, said front wheel assemblies being adapted to engage the ground;
    means for steering said front wheel assemblies through a first range of angles;
    at least one rear axle connected to said rear portion of said frame and connected to rear wheel assemblies that engage the ground;
    an auxiliary steering axle connected to said frame between said front steering axle and said rear axle, said auxiliary steering axle being connected to steerable auxiliary wheel assemblies that engage the ground, said auxiliary wheel assemblies coupled to said means for steering said front wheel assemblies, said auxiliary wheel assemblies adapted to be steered through a second range of angles, wherein a ratio between said first range of angles and said second range of angles is a steering ratio; and
    means for remotely adjusting said steering ratio coupled to said auxiliary wheel assemblies.

2. The elongated single-unit vehicle of claim 1, further comprising an axle lifting mechanism connected to said front steering axle and adapted to move said front steering axle between a lowered position, wherein said front wheel assemblies engage the ground, and a lifted position, wherein said front wheel assemblies are off the ground.

3. The elongated single-unit vehicle of claim 2 wherein said front steering axle is connected to a biasing device that biases said front steering axle toward said lowered position.

4. The elongated single-unit vehicle of claim 1 wherein said means for remotely adjusting said steering ratios is controllable from a driver compartment area of said vehicle.

5. The elongated single-unit vehicle of claim 1 wherein said auxiliary steering axle is closer to said front steering axle than to said rear axle.

6. The elongated single-unit vehicle of claim 1 wherein said means for remotely adjusting said steering ratio is coupled to said auxiliary wheel assemblies and adapted to change said second range of angles through which said auxiliary wheel assemblies move.

7. The elongated single-unit vehicle of claim 1, further comprising a linkage assembly coupled to said front and auxiliary wheel assemblies, said linkage assembly being adapted to simultaneously turn said front and auxiliary wheel assemblies.

8. The elongated single-unit vehicle of claim 7 wherein said linkage assembly comprises a transmission arm pivotally connected to said frame and coupled to at least one of said auxiliary wheel assemblies, said transmission arm being adapted to steer said auxiliary wheel assemblies in response to an adjustment of said steering means, said transmission arm further coupled to said means for remotely adjusting said steering ratio.

9. The elongated single-unit vehicle of claim 7 wherein said linkage assembly comprises:
a first transmission arm coupled to said steering means and pivotally connected to said frame;
a first connecting member attached at one end to said first transmission arm and attached at its opposite end to at least one of said front wheel assemblies;
a second transmission arm pivotally connected to said frame rearward of said first transmission arm, said second transmission arm further connected to said means for remotely adjusting said steering ratio;
a second connecting member attached at one end to said first transmission arm and connected at its opposite end to said second transmission arm; and
a third connecting member attached at one end to said second transmission arm and attached at its opposite end to at least one of said auxiliary wheel assemblies.

10. The elongated single-unit vehicle of claim 9 wherein said second transmission arm has a slot therein that slidably receives said opposite end of said connecting member, said second connecting member being operatively attached to a said means for remotely adjusting said steering ratio, wherein said adjusting means comprises a remotely controlled actuator adapted to move said opposite end of said second connecting member within said slot so as to change said second range of angles through which said auxiliary wheel assemblies will turn, thereby adjusting said steering ratio.

11. A steering assembly for an elongated single-unit vehicle having a frame with front and rear portions, said rear axle coupled to the rear portion of the frame, and rear wheel assemblies connected to the rear axle and adapted to engage the ground, comprising:
a front steering axle connected to the front portion of the frame and connected to steerable front wheel assemblies that are adapted to engage the ground;
means for steering said front wheel assemblies through a first range of angles;
an auxiliary steering axle connected to the front portion of the frame rearward of said front steering axle, and connected to steerable auxiliary wheel assemblies that engage the ground, said auxiliary wheel assemblies being coupled to said front wheel assemblies and being adapted to be steered through a second range of angles, wherein a ratio between said first range of angles and said second range of angles is a steering ratio; and
means for remotely adjusting said steering ratio coupled to said auxiliary wheel assemblies.

12. The steering assembly of claim 11, further comprising an axle lifting assembly connected to said front steering axle, said axle lifting assembly being adapted to move said front steering axle between a lowered position, wherein said front wheel assemblies engage the ground, and a lifted position, wherein said front wheel assemblies are off the ground, such that the vehicle has a shorter wheel base when said axle lifting assembly is in said lifted position.

13. The steering assembly of claim 12 wherein said front steering axle is connected to a biasing assembly that biases said front steering axle toward said lowered position.

14. The steering assembly of claim 11 wherein said means for remotely adjusting said steering ratio is coupled to said auxiliary wheel assemblies and adapted to change said second range of angles through which said auxiliary wheel assemblies move.

15. The steering assembly of claim 14, further comprises linkage assembly coupled to said front and auxiliary wheel assemblies, said linkage assembly being adapted to simultaneously turn said front and auxiliary wheel assemblies upon adjustment of said steering means.

16. The steering assembly of claim 15 wherein said linkage assembly has a remotely adjustable slidable relay link adapted to change said second range of angles, thereby changing said steering ratio.

17. The steering assembly of claim 15 wherein said linkage assembly comprises a transmission arm pivotally connected to the frame and coupled to at least one of said auxiliary wheel assemblies, said transmission arm being adapted to steer said auxiliary steering axle in response to movement of said steering means, said transmission arm further adapted to change said second range of angles through which said auxiliary wheel assemblies turn, thereby changing said steering ratio.

18. The steering assembly of claim 15 wherein said linkage assembly comprises:
a first transmission arm coupled to said vehicle steering means and pivotally connected to the frame;
a first connecting member attached at one end to said first transmission arm and attached at its opposite end to at least one of said front wheel assemblies;
a second transmission arm pivotally connected to the frame rearward of said first transmission arm, said second transmission arm further coupled to said means for remotely adjusting said steering ratio;
a second connecting member attached at one end to said first transmission arm and attached at its opposite end to said second transmission arm; and
a third connecting member attached at one end to said second transmission arm and attached at its opposite end to at least one of said auxiliary wheel assemblies.

19. The steering assembly of claim 18 wherein said second transmission arm has a slot therein that slidably receives said opposite end of said second connecting member, said second connecting member being operatively attached to said means for remotely adjusting said steering ratio, wherein said adjustment means comprises a remotely controlled actuator adapted to move said opposite end of said second connecting member within said slot so as to change said second range of angles through which said auxiliary wheel assemblies will turn, thereby adjusting said steering ratio.

20. A method of steering a motor vehicle around a corner, the motor vehicle having a frame, a front steering axle with steerable front wheel assemblies attached thereto and adapted to turn through a first range of angles, at least one rear axle with rear wheel assemblies connected thereto, an auxiliary steering axle connected to the frame between the front steering axle and the rear axle, the auxiliary steering axle having steerable auxiliary wheel assemblies connected thereto and adapted to turn through a second range of angles such that a ratio between the first and second range of angles is a steering ratio, and a vehicle steering system coupled to the front and auxiliary steering axles, the method comprising the steps of:

moving the vehicle along a path having a curve such that the vehicle has a first steering ratio;

lifting the front steering axle from a lowered position, wherein the front wheel assemblies engage the ground, to a lifted position, wherein the front wheel assemblies are lifted off the ground while the auxiliary and rear wheel assemblies remain in engagement with the ground, thereby shortening the wheel base of the vehicle prior to entering the corner;

adjusting the second range of angles through which the auxiliary wheel assemblies turn so that the vehicle has a second steering ratio different front said first steering ratio; and steering the vehicle around the curve such that the auxiliary and rear wheel assemblies are operable to move along the path.

21. The method of claim 20, further comprising the step of lowering the front steering axle to said lowered position so the front wheel assemblies engage the ground while the auxiliary and rear wheel assemblies remain in engagement with the ground, thereby lengthening the wheel base of the vehicle.

22. The method of claim 21, further comprising the step of adjusting a means for remotely varying the steering ratio between said first and second steering ratios.

23. The method of claim 22 wherein said step of adjusting the means for remotely varying the steering ratio comprises adjusting the steering ratio changing means from inside a driving compartment area of the vehicle.

* * * * *